US012717188B2

(12) United States Patent
Neyts

(10) Patent No.: US 12,717,188 B2
(45) Date of Patent: Aug. 25, 2026

(54) METHOD FOR DERIVING A SURFACE PROFILE OF A FREE-FORM MASTER LENS FOR PATTERNING PHOTO-ALIGNMENT LAYERS OF PLANAR OPTICAL COMPONENTS

(71) Applicant: UNIVERSITEIT GENT, Ghent (BE)

(72) Inventor: Kristiaan Neyts, Ghent (BE)

(73) Assignee: UNIVERSITEIT GENT, Ghent (BE)

( * ) Notice: Subject to any disclaimer, the term of this patent is extended or adjusted under 35 U.S.C. 154(b) by 386 days.

(21) Appl. No.: 18/294,041

(22) PCT Filed: Aug. 22, 2022

(86) PCT No.: PCT/EP2022/073357
§ 371 (c)(1),
(2) Date: Jan. 31, 2024

(87) PCT Pub. No.: WO2023/025735
PCT Pub. Date: Mar. 2, 2023

(65) Prior Publication Data

US 2024/0427196 A1 Dec. 26, 2024

(30) Foreign Application Priority Data

Aug. 23, 2021 (EP) .................................... 21192650

(51) Int. Cl.
*G02F 1/1337* (2006.01)
*G01M 11/02* (2006.01)

(52) U.S. Cl.
CPC ... *G02F 1/133788* (2013.01); *G01M 11/0242* (2013.01)

(58) Field of Classification Search
CPC ......... G02F 1/133788; G01M 11/0242; B29D 11/00009; B29D 11/00644; B29D 11/00769; B29D 11/00865; B29D 11/00355; G02B 5/1857; G02B 5/1876; G02B 5/3016; G02B 5/32; G02B 27/0012; G02B 3/0087
See application file for complete search history.

(56) References Cited

U.S. PATENT DOCUMENTS 10,197,715 B1 2/2019 Tabirian
2017/0085846 A1* 3/2017 Damberg ............ H04N 9/3161
2019/0227375 A1 7/2019 Oh et al.
2021/0033765 A1 2/2021 Sato et al.

OTHER PUBLICATIONS

International Search Report dated Nov. 28, 2022.

* cited by examiner

*Primary Examiner* — Michael Maskell
(74) *Attorney, Agent, or Firm* — IPSILON USA, LLP

(57) ABSTRACT

A method is provided for deriving a surface profile of a free-form master lens for patterning one or two photo-alignment layers of a planar optical component. The method includes obtaining a desired optical function of the planar optical component; and obtaining an actual optical function of the planar optical component, the actual optical function being described as recorded using a free-form test lens with a surface profile configured to provide the desired optical function. The method includes estimating a deviation between the desired optical function and the actual optical function; and correcting the surface profile of the free-form test lens using the estimated deviation, thereby deriving a surface profile for the free-form master lens.

13 Claims, 6 Drawing Sheets

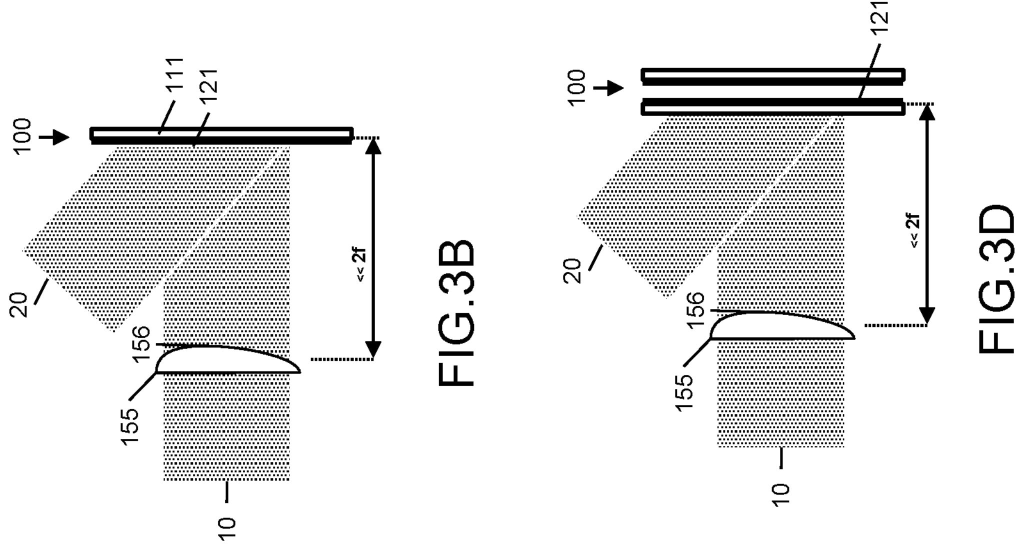
100
111
121
20
<< 2f
156
155
10
FIG.3B
100
121
20
<< 2f
156
155
10
FIG.3D
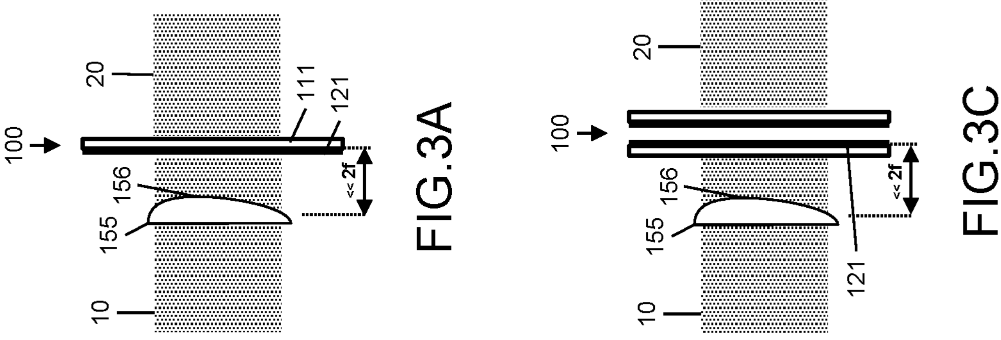
100
20
111
121
156
<< 2f
155
10
FIG.3A
100
20
156
<< 2f
155
10
121
FIG.3C

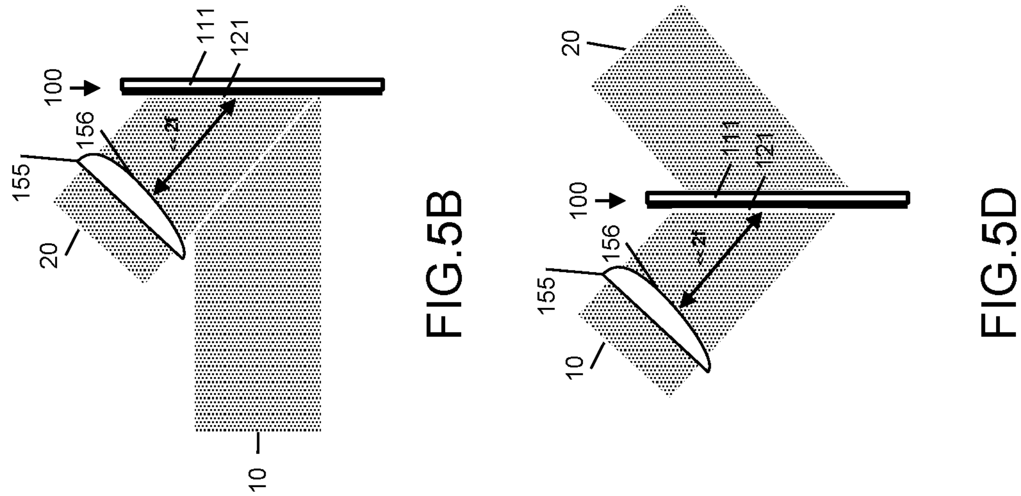
FIG.5B
FIG.5D
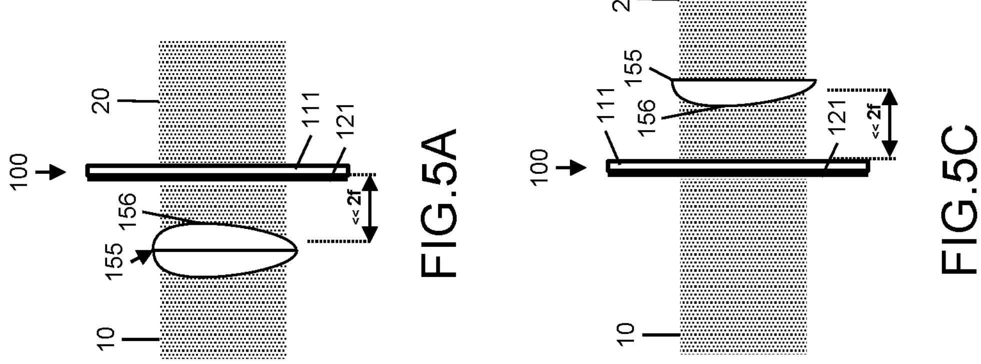
FIG.5A
FIG.5C

METHOD FOR DERIVING A SURFACE PROFILE OF A FREE-FORM MASTER LENS FOR PATTERNING PHOTO-ALIGNMENT LAYERS OF PLANAR OPTICAL COMPONENTS

RELATED APPLICATION

This application is a National Phase of PCT/EP2022/073357 filed on Aug. 22, 2022, which claims the benefit of priority from European Patent Application No. 211 926 50.6 filed on Aug. 21, 2021, the entirety of which are incorporated by reference.

TECHNICAL FIELD

The present disclosure relates to a method for deriving a surface profile of a free-form master lens and to a method for fabricating planar optical components and more specifically liquid-crystal-based optical components using the free-form master lens.

BACKGROUND

The self-organization properties of liquid-crystal materials allow the manufacturing of flat or planar and, moreover, miniaturized optical components or optical devices. Such liquid-crystal-based planar optical devices include liquid-crystal diffraction or polarization gratings, lenses, and so on, and are essential in many applications ranging from example optical communication systems to electronic displays and virtual/artificial reality glasses. Liquid-crystal diffraction gratings can for example be formed as a substrate provided with a patterned photo-alignment layer which pattern defines how the liquid-crystal material deposited on top of the patterned photo-alignment layer deflects the incident light beam. In other words, the pattern photo-alignment layer defines the optical function of the optical component. Similarly, the liquid-crystal lenses can for example be formed as two substrates spaced apart with their respective inwardly facing surfaces being provided with patterned photo-alignment layers. Again, the patterned photo-alignment layers define how the liquid-crystal material provided therebetween deflects the incident light beam and, therefore, the optical function of the planar optical component. The photo-alignment layers contain photo-sensitive material whose molecules change their orientation when being illuminated with light, for example, visible light or UV light which in turn causes the molecules of the liquid-crystal material to follow their orientation alignment. The patterning of these photo-alignment layers is typically done by means of holographic patterning. Holographic patterning uses two circularly polarized light beams such as laser beams to illuminate the photo-alignment layers. Depending on the illumination setup, i.e., depending on how the photo-alignment layers and therefore the planar optical component is illuminated, the circularly polarized light beams can have the same or opposite handedness. Further, to record a pattern on the photo-alignment layers, one of the light beams illuminates the photo-alignment layers through a master lens which has the desired optical function. As a result, the optical function of the master lens is recorded on the photo-alignment layers. However, current solutions for manufacturing liquid-crystal-based planar optical components such as diffraction or polarization gratings, and lenses allow recording the optical function of spherical master lenses. The recording of the optical function of a free-form master lens is to this end not known thus limiting their widespread use.

SUMMARY

It is an object of embodiments of the present disclosure to provide a solution for deriving a free-form master lens for creating planar optical components characterized with the same or substantially the same optical function as the free-form master lens in a cost- and time-efficient manner.

The scope of protection sought for various embodiments of the invention is set out by the independent claims. The embodiments and features described in this specification that do not fall within the scope of the independent claims, if any, are to be interpreted as examples useful for understanding various embodiments of the invention.

This object is achieved, according to a first example aspect of the present disclosure, by a method for deriving a surface profile of a free-form master lens for patterning one or two photo-alignment layers of a planar optical component as defined by claim 1. In particular, the method comprises defining a desired optical function of the planar optical component. The desired optical function specifies the optical properties of the planar optical component for example how an incident light beam such as a laser beam is deflected by the planar optical component. The desired optical function can be obtained for example from a customer specification. The method further comprises determining surface profile of a free-form test lens configured to provide the desired optical function. The method further comprises receiving a distance between the free-form test lens and the planar optical component. The method further comprises receiving a wavelength of a recording light beam. The method further comprises determining an actual optical function of the planar optical component. The actual optical function can be described as, for example, being recorded using the free-form test lens with a surface profile configured to provide the desired optical function. In contrast to conventional holographic patterning where the recording is done using a spherical master lens where the light beam deflected from the spherical master lens has the same shape at twice the focal length or focal point of the spherical master lens, herein this relationship is not observed. As a result, the optical function as it would be recorded onto the planar optical component, i.e., the actual optical function, is not the same or substantially the same but rather deviates substantially from the desired optical function. To compensate for this deviation, the method further comprises determining the deviation between the desired optical function and the actual optical function by comparing phase differences corresponding to the desired optical function and phase differences corresponding to the actual optical function, i.e. by comparing the phase differences corresponding to the desired optical function and the phase differences imparted by the free-form test lens on the photo-alignment layers. The deviation quantifies the deformation that an incident light experiences once it passes through the free-form master lens which in turn causes this incident light beam to arrive at or strike the photo-alignment layer at a location that is different from the desired location. Exploiting this observation allows expressing this deviation as a deviation in the surface profile of the free-form test lens which can then be used to correct its surface profile to obtain a surface profile for the free-form master lens. The method thus further comprises determining a corrected surface profile of the free-form test lens using the determined deviation to derive the surface profile for the free-form master lens. The free-form master lens with the thus derived surface profile can then be manufactured using conventional manufacturing techniques for example by grounding, polishing the free-form master lens to obtain the desired surface profile. Doing so allows manufacturing of a free-form master lens which can be later used to pattern the photo-alignment layers of planar optical components which have the same or substantially the same optical function as the desired optical function. Numerous trial and error testing until the planar optical component are avoided resulting in a cost and time-efficient solution since the surface profile of the free-form master lens can now be derived solely based on the desired optical functionally and the surface profile of the free-form test lens. The method according to the present disclosure may be used in many applications ranging from example optical communication systems to electronic displays and virtual/artificial reality glasses, augmented reality for example for glasses and/or helmets with projection lenses.

The actual optical function of the planar optical component and, more specifically, the patterning of its one or two photo-alignment layers, can for example be obtained by means of holographic patterning which comprises illuminating the planar optical component by means of two circularly polarized laser beams and the free-form test lens.

Preferably, the illumination is performed by illuminating one side of the one or two photo-alignment layers of the planar optical component through the free-form test lens with one of the two circularly polarized laser beams and illuminating the same side of the one or two photo-alignment layers of the planar optical component with the other circularly polarized laser beam, and wherein the circularly polarized laser beams have an opposite handedness and are positioned at a predetermined angle with each other in order to pattern the one or two photo-alignment layers. This illumination setup allows placing the planar optical component in front of the manufactured free-form test lens and at a distance smaller than twice the focal point of the free-form test lens. Herein, however, for the holographic patterning, it is required that the free-form test lens is physically placed so that it allows only one of the circularly polarized laser beams to pass through the lens and the other not. This, the distance at which the planar optical component can be physically placed in front of the free-form test lens further has a lower bound that needs to assure that only one of the circularly polarized laser beams passes through the free-form test lens.

More preferably, the illumination is performed by illuminating one side of the one or two photo-alignment layers of the planar optical component through the free-form test lens with one of the two circularly polarized laser beams and illuminating the opposite side of the one or two photo-alignment layers of the planar optical component with the other circularly polarized laser beam, wherein the two circularly polarized laser beams have a same handedness and are incident at a straight angle or at an angle with each other in order to pattern the photo-alignment layer. Advantageously, these illumination setups allow placing the planar optical component in front of the manufactured free-form test lens and at a distance smaller than twice the focal point of the free-form test lens or even physically touching the free-form test lens as now the illumination of the planar optical component can be done from opposite sides. Thus, these illumination setups avoid the limitation of the above-described one.

Preferably, the determination of the deviation comprises tracing incident locations of the respective rays of the circularly polarized laser beam illuminating the one or two photo-alignment layers through the free-form test lens, i.e., the location of these rays on the one or two photo-alignment layers. Further, the tracing is done such that these incident locations indicate the locations at which the respective rays arrive or strike the one or more photo-alignment layers relative to the centre location or the center point of the one or two photo-alignment layers. Knowing these locations allows calculating the angles, $\theta_R$, at which the respective incident rays strike the photo-alignment layers relative to the surface normal of the photo-alignment layers and, therefrom, calculating the phase differences, $\Gamma_{UV}$, between the incident rays' locations and the centre location. In other words, these phase differences allow defining the optical function of the resulting one or more patterned photo-alignment layers and, therefore, the optical function of the resulting planar optical component, in terms of these locations, i.e., $\Gamma_{UV}=f(x', y')$. Advantageously, this relationship further allows determining or deriving by, for example, reverse calculating, the surface profile of the free-form test lens. As a result, knowing the phase differences and the surface profile of the free-form lens allows calculating the difference between the calculated surface profile of the free-form test lens and its actual surface profile, which in turn, allows expressing the deviation between the optical function of the resulting planar optical component and the optical function of the free-form test lens, i.e., the desired optical function, as a deviation in the surface profile of the free-form test lens. The method, thus, further comprises calculating or determining a deviation in the surface profile of the free-form test lens from the obtained phase differences and the surface profile of the free-form test lens. In other words, the deviation in the surface profile of the free-form test lens and, therefore, the deviation between the optical function of the planar optical component and the desired optical functions by cost- and time-efficient manner. Advantageously, the method further comprises correcting the surface profile of the free-form test lens by determining a corrected surface profile of the free-form test lens using the calculated deviation in its surface profile, thereby deriving the surface profile of the free-form master lens.

According to a second example aspect, a method for fabricating a planar optical component is disclosed having the features of claim 10. In particular, the method comprises providing a substrate coated with a photo-alignment layer. The substrate can be a transparent or an absorbing substrate. The coating can be done by means of spin-coating or other techniques suitable for depositing the photo-alignment layer. To transform the coated substrate into an optical component, the method further comprises patterning the photo-alignment layer to provide a pattern thereon and providing liquid-crystal material over the patterned photo-alignment layer, thereby aligning the liquid crystal material based on the photo-alignment pattern. The patterning can be done for example by means of holographic patterning and the free-form master lens with the desired optical function obtained according to the first example aspect. More specifically, the holographic patterning illuminates the photo-alignment layer using two circularly polarized laser beams. The illumination can be performed using any of the two illumination setups described above with reference to the first example aspect. However, the patterning herein has to be performed using the same illumination setup as the one used to derive the surface profile of the free-form master lens. For example, if the surface profile of the free-form master lens is derived by holographic patterning using two circularly polarized laser beams illuminating the same side of the photo-alignment layer, then the holographic patterning herein needs to use the same illumination setup. As a result of the patterning, the optical function of the free-form master lens is copied or replicated onto the photo-alignment layer as a photo-alignment pattern. The liquid crystal material is then provided on top of the patterned photo-alignment layer. The liquid crystal material can be provided over the patterned photo-alignment layer by means of spin-coating techniques or similar. Once, the liquid crystal material is deposited on the patterned photo-alignment layer, the liquid crystal material aligns itself in accordance with the photo-alignment pattern. As a result, a planar optical component is fabricated characterized with the same optical function as the free-form master lens.

According to a third example aspect, a method for fabricating a planar optical component is disclosed having the features of claim 11. In particular, the method comprises providing two substrates spaced apart to provide a gap therebetween. The two substrates can be both transparent. Alternatively, one of the substrates can be absorbing and the other one transparent. The two substrates can for example be spaced apart by means of spherical spacer balls placed near the edges of the substrates. The substrates can then be for example glued together with glue to form a cell. Before forming the cell, the surfaces of the substrates which will be facing one another once the cell is formed are respectively coated with a photo-alignment layer. The coating can be done by means of spin-coating or other techniques suitable for depositing the photo-alignment layer. To transform the resulting cell into an optical component, the method comprises patterning the photo-alignment layers to form a pattern thereon and filling the gap between the substrates with a liquid-crystal material, thereby aligning the liquid crystal material based on the photo-alignment pattern. The patterning can be done for example by means of holographic patterning and the free-form master lens with the desired optical function obtained according to the first example aspect. More specifically, the holographic patterning illuminates the two photo-alignment layers using two circularly polarized laser beams at the same time. In other words, the patterning of the two layers is done in a single step. Similar to the second example aspect, the illumination can be performed using any of the two illumination setups described above with reference to the first example aspect. However, the patterning herein has to be performed using the same illumination setup as the one applied to derive the surface profile of the free-form master lens. For example, if the surface profile of the free-form master lens is derived by holographic patterning using two circularly polarized laser beams illuminating the same side of the photo-alignment layer, then the holographic patterning herein needs to use the same illumination setup. As a result of the patterning, the optical function of the free-form master lens is copied or replicated onto the photo-alignment layer as a photo-alignment pattern. The liquid crystal material is then provided in the gap, i.e., between the patterned photo-alignment layer. The liquid crystal material can be provided in the gap by any known techniques such as capillary filling, vacuum filling, or similar. Once, the cell is filled in with the liquid crystal material, the liquid crystal material aligns itself in accordance with the patterns of the photo-alignment layers. As a result, a planar optical component is fabricated characterized with the same optical function as the free-form master lens.

According to a fourth example aspect, a computer program product is disclosed having the features of claim 12. In particular, the computer program product comprises computer-executable instructions for performing the steps of the method according to the first example aspect when the program is run on a computer.

According to a fifth example aspect, a computer readable storage medium is disclosed having the features of claim 13. In particular, the computer readable storage medium comprises computer-executable instructions for performing the steps of the method according to the first example aspect when the program is run on a computer:

The various example embodiments of the first example aspect may thus be applied as example embodiments to the second, third, fourth, and fifth example aspects.

BRIEF DESCRIPTION OF THE DRAWINGS

Some example embodiments will now be described with reference to the accompanying drawings.

FIG. 3A shows a schematic representation of a setup for patterning the photo-alignment layer of the planar optical component of FIG. 1A according to a first exemplary embodiment of the present disclosure;

FIG. 3B shows a schematic representation of a setup for patterning the photo-alignment layer of the planar optical component of FIG. 1A according to a second exemplary embodiment of the present disclosure;

FIG. 3C shows a schematic representation of a setup for patterning the photo-alignment layers of the planar optical component of FIG. 1C according to a first exemplary embodiment of the present disclosure;

FIG. 3D shows a schematic representation of a setup for patterning the photo-alignment layers of the planar optical component of FIG. 1C according to a second exemplary embodiment of the present disclosure;

FIG. 5A shows a schematic representation of a setup for patterning the photo-alignment layer of the planar optical component of FIG. 1A according to an exemplary embodiment of the present disclosure;

FIG. 5B shows a schematic representation of a setup for patterning the photo-alignment layer of the planar optical component of FIG. 1A according to an exemplary embodiment of the present disclosure;

FIG. 5C shows a schematic representation of a setup for patterning the photo-alignment layers of the planar optical component of FIG. 1C according to an exemplary embodiment of the present disclosure; and FIG. 5D shows a schematic representation of a setup for patterning the photo-alignment layers of the planar optical component of FIG. 1C according to an exemplary embodiment of the present disclosure.

DETAILED DESCRIPTION OF EMBODIMENT(S)

Figures 1A, 1B, 1C, 1D:
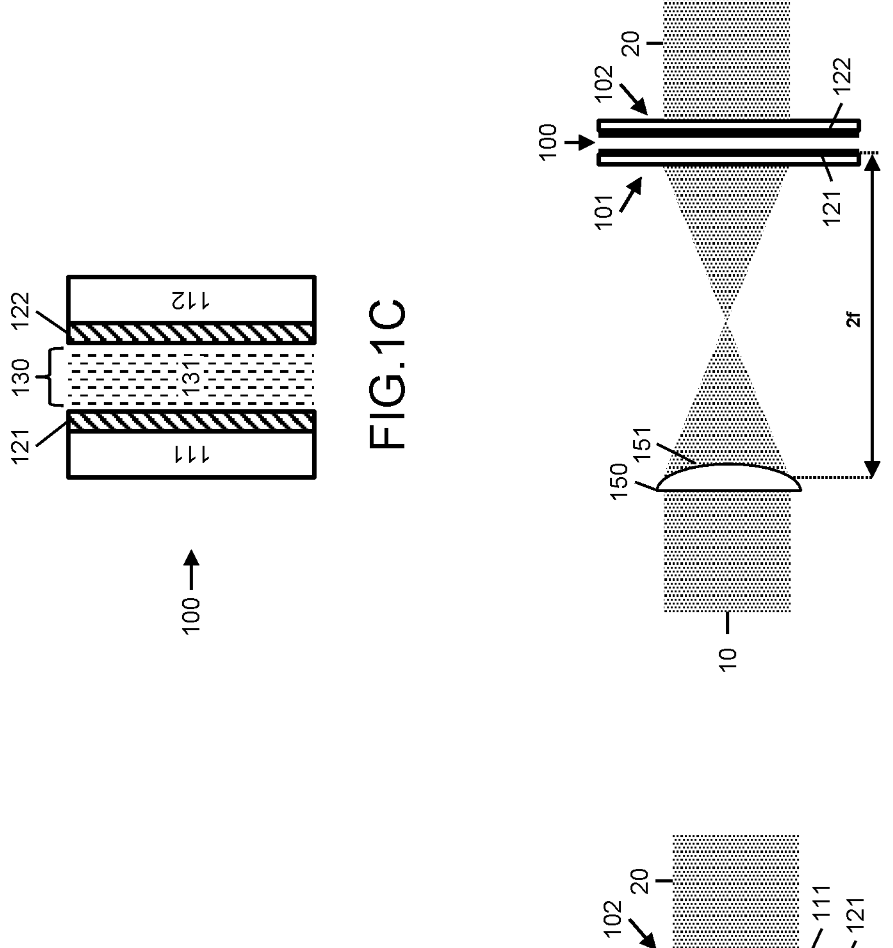
FIG. 1A shows an example of a planar optical component according to an embodiment of the present disclosure.
FIG. 1B shows a schematic representation of a conventional setup for patterning the photo-alignment layer of the planar optical component of FIG. 1A.
FIG. 1C shows an example of a planar optical component according to an embodiment of the present disclosure.
FIG. 1D shows a schematic representation of a conventional setup for patterning the photo-alignment layers of the planar optical component of FIG. 1C.

FIG. 1A shows an example of a planar optical component 100 according to a first exemplary embodiment of the present disclosure. The planar optical component 100 comprises a substrate 111, a photo-alignment layer 121 provided on top of the substrate 111, and a layer 131 of a liquid-crystal material 130 provided on top of the photo-alignment layer. The substrate can for example be made of a transparent material such as glass. The substrate may also be absorbing such as a substrate with a metallic top layer a transparent overlayer with thickness of about a quarter wavelength makes the photo-alignment process more efficient. The photo-alignment layer 121 can be made of any photosensitive material whose molecules change their orientation when being illuminated with visible or UV light which in turn causes the molecules of the liquid-crystal material to follow their orientation alignment. Some examples of photo-alignment materials containing azo groups are brilliant yellow, SD1 and PAAD. The photo-alignment layer 121 can be deposited on top of the substrate using any convention techniques, such as coating or spin-coating. Layer 131 of liquid-crystal material 130 can comprise a liquid-crystal material such as the nematic liquid crystal E7, or a chiral liquid crystal (E7 with chiral dopant) and it can be deposited on top of the photo-alignment layer 121 using the same depositing techniques as for the photo-alignment layer.

This planar optical component can function for example as a diffractive or polarization grating. To define its optical function, the photo-alignment layer 121 needs to be patterned before depositing the liquid-crystal material 130. The patterning of the photo-alignment layer can be done using holographic patterning. Conventional holographic patterning uses two circularly polarized light beams such as laser beams which emit visible light or UV light to illuminate the photo-alignment layer. Such light beams can be provided by laser diodes such as GaInP- and AlGaInP-based laser diodes as well as GaN-based blue-emitting diodes. Two illumination setups for holographic patterning are possible. As shown in FIG. 1B, the first illumination setup uses the two circularly polarized light beams 10 and 20 to illuminate the photo-alignment layer 121 and, therefore, the planar optical component 100 from its opposite sides 101 and 102. In this setup, the two light beams have the same circular polarization, i.e., the same handedness, and are positioned so that they are incident at a straight angle, i.e., their light beams are facing each other. According to the second setup, the two circularly polarized light beams illuminate the same side of the photo-alignment layer 121 and therefore the planar optical component 100. Typically, this is the side that is subsequently covered with the liquid-crystal material 130. In this setup, the two light beams have the opposite circular polarization, i.e., opposite handedness, and are positioned so that they illuminate the photo-alignment layer 121 at an angle with each other which angle is defined by the wavelength of the light beams 10 and 20. Typically, one of the light beams, e.g., the light beam 10, is incident at a right angle with respect to the surface plane of the photo-alignment layer, while the other light beam is incident at an angle with respect to the other light beam. To record the pattern on the photo-alignment layer 121 and therefore to define the desired optical function of the planar optical component 100, in either of the illumination setups, one of the light beams illuminates the photo-alignment layer 121 through a master lens. In the example of FIG. 1B, the light beam 10 illuminates the photo-alignment layer 121 through the master lens 150. Importantly, conventional holographic patterning uses a spherical master lens 150, i.e., a lens with a plano-convex surface 151 positioned at a distance from the planar-optical component equal twice the focal point or the focal length of the spherical master lens, i.e., d=2f, as shown in FIG. 1B.

FIG. 1C shows another example of a planar optical component 100 according to a second exemplary embodiment of the present disclosure. The planar optical component comprises two substrates 111 and 112. Each substrate 111 and 112 is provided with a respective photo-alignment layer 121 and 122. The substrates can be made of the same materials as described above with reference to the example of FIG. 1A . . . That is, the two substrates can be either both made of transparent material or, alternatively, one of them can be absorbing and the other one, i.e., the one that will be illuminated through the lens 150, transparent. Similarly, the photo-alignment layers can be made of the same material and can be deposited on the substrate using the same techniques as described above with reference to the example of FIG. 1A. The coated substrates are then placed so that their inwardly facing surfaces are the coated surfaces. Further, the substrates are placed at a distance from each other to provide a gap therebetween which gap is then filled in with liquid-crystal material 130 such as the nematic liquid crystal E7, or a chiral liquid crystal (E7 with chiral dopant) to form a layer 131 of this liquid-crystal material 130. The spacing between the substrates can be provided by, for example, using spacer elements such as spherical spacer balls which can be positioned close to the corners of the substrates and the substrates can be glued together.

This planar optical component can function for example as a diffractive lens. To define its optical functions, respective photo-alignment layers 121 and 122 of the planar optical component need to be patterned before the gap between the substrates 111 and 112 is filled in with the liquid-crystal material 130. Similar to the example of FIG. 1A, the patterning of the photo-alignment layers 121 and 122 of this planar optical component can be done using holographic patterning. Again, the same two conventional illumination setups as described above can be used for patterning the photo-alignment layers 121 and 121 of the planar optical component of FIG. 1C. More specifically, in the first illumination setup, as shown in FIG. 1D, the two circularly polarized light beams 10 and 20 illuminate the photo-alignment layers 121 and 122 and, therefore, the planar optical component 100 from its opposite sides 101 and 102. In this setup, the two light beams have the same circular polarization, i.e., the same handedness, and are positioned so that they are incident at a straight angle, i.e., their light beams are facing each other. Similar to FIG. 1B, herein, the patterns on the photo-alignment layers 121 and 122 are recorded by assuring that one of the light beams illuminates them through a spherical master lens 150. In this figure, light beam 10 illuminates the photo-alignment layers 121 and 122 through the spherical master lens 150 which is positioned at a distance from the planar-optical component equal twice the focal point or the focal length of the spherical master lens, i.e., d=2f, as shown in FIG. 1C.

When using a free-form master lens to pattern the photo-alignment layers of the planar optical components of FIG. 1A and FIG. 1B, the optical function of the resulting planar optical components deviates substantially from the optical function of the free-form master lens used during the patterning step. This is because the light beam deflected from the free-form master lens does not have the same shape at any distance from the photo-alignment layer or layers of the planar optical component. As a result, the optical function recorded onto the planar optical component deviates substantially from the optical function of the free-form master lens.

Figures 2A, 2B:
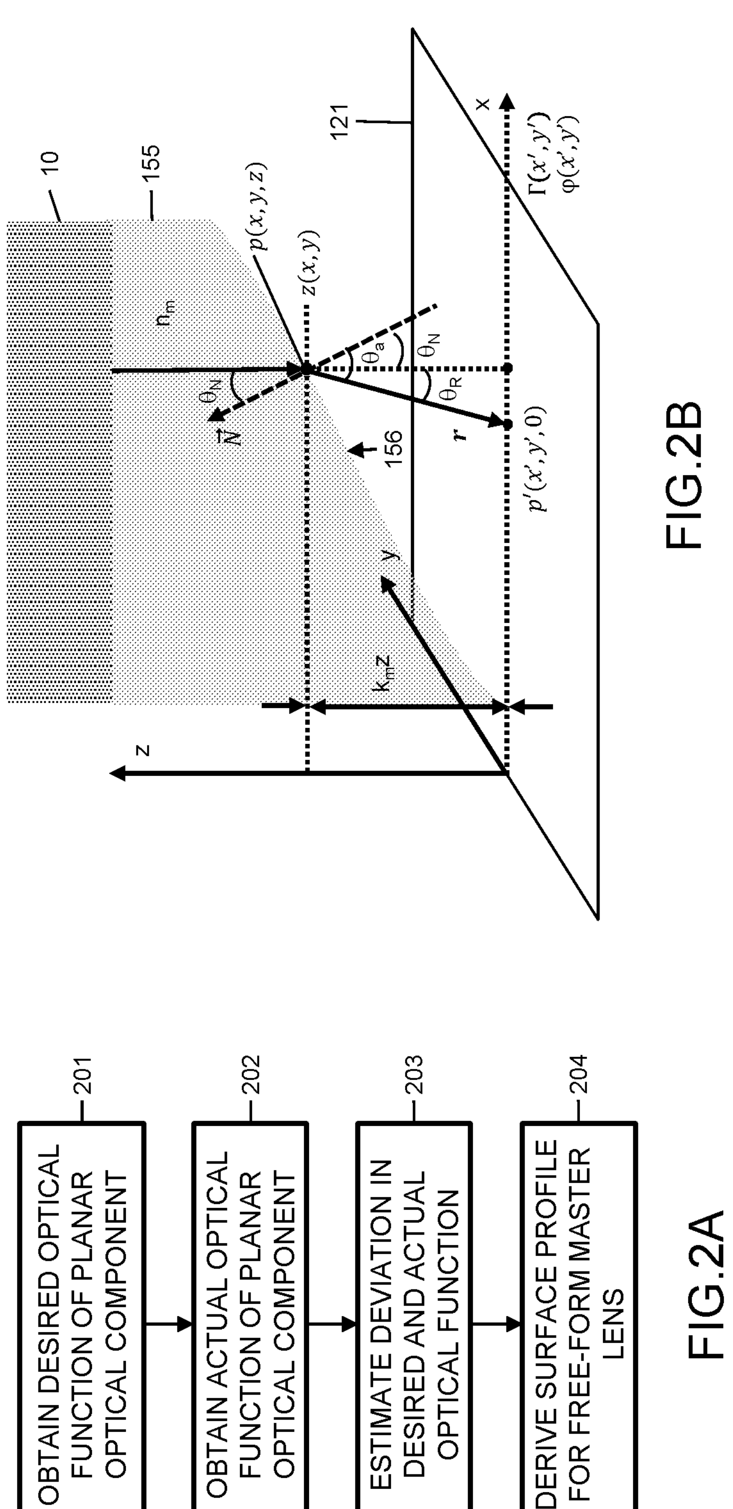
FIG. 2A shows steps for deriving a surface profile of a free-form master lens for patterning photo-alignment layers of planar optical components according to an example embodiment of the present disclosure.
FIG. 2B shows a graphical representation of tracing the location of an incident ray on the photo-alignment layer according to an embodiment of the present disclosure.

To solve this problem the present disclosure proposes a novel approach for designing a free-form master lens to alleviate the above problem. The novel approach proposes a novel solution for deriving a surface of the free-form master lens for patterning photo-alignment layer or layers of planar optical components and will be described in detail with reference to FIG. 2A and FIG. 2B, with FIG. 2A showing the steps to derive the surface profile of the free-form master lens and FIG. 2B showing the graphical representation of tracing the location of an incident ray on the photo-alignment layer.

In the first step of the method, i.e., step 201, the optical function for the planar optical component 100 is obtained. In other words, a description of the desired optical function is obtained which can for example be described as the phase difference obtainable by the planar optical component upon transmission or reflection when illuminated with a light beam with a particular wavelength, for example in the green spectrum. For a liquid crystal flat optical component based on nematic or chiral nematic liquid crystal, the phase difference can be translated into an azimuthal angle $\varphi_{LC}(x', y')$ of the liquid crystal director at the alignment surfaces. To obtain the given alignment, a phase difference between the two circularly polarized illumination beams with illumination, for example, in the blue spectrum, is required in the process of photoalignment: $\Gamma_B(x', y')=2\varphi_{LC}(x', y')$, for example.

In the next step, i.e., step 202, the actual optical function of the planar optical component 100 is obtained as it would be recorded when a free-form test lens 155 with a surface profile 156 is configured to provide the desired illumination condition $\Gamma_B(x', y')$ for patterning the photo-alignment layer or layers of the planar optical component 100. This can be achieved by employing the illumination setups for holographic patterning as shown in FIG. 3A to FIG. 3F, where FIG. 3A and FIG. 3B show the illumination setups for patterning the photo-alignment layer of planar optical components as the one shown in FIG. 1A, FIG. 3C and FIG. 3D show the same illumination setups this time for patterning the photo-alignment layers of planar optical components as the one shown in FIG. 1C, and FIG. 3E and FIG. 3D show the illumination setups for the planar optical components of FIG. 1A and FIG. 1C but with the inclined beam illuminating the opposite side of the planar optical component.

Figure 3F:
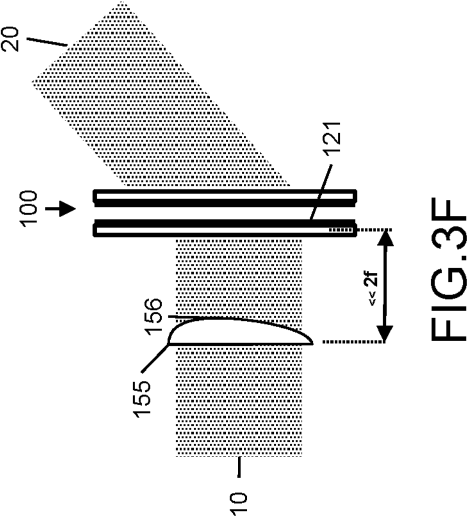
FIG. 3F shows a schematic representation of a setup for patterning the photo-alignment layers of the planar optical component of FIG. 1C according to a third exemplary embodiment of the present disclosure.
Figure 3E:
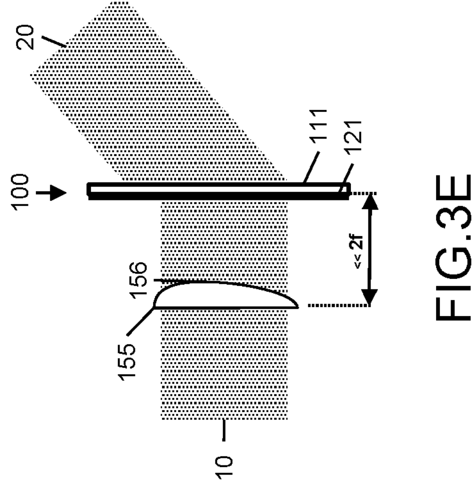
FIG. 3E shows a schematic representation of a setup for patterning the photo-alignment layer of the planar optical component of FIG. 1A according to a third exemplary embodiment of the present disclosure.

The illumination setups of FIG. 3A and FIG. 3C correspond to the first illumination setup for holographic patterning described above with reference to FIG. 1B and FIG. 1D, respectively, with the only difference that the spherical lens 150 of FIG. 1B and FIG. 1D is now replaced with a free-form test lens 155 and that the free-form test lens is placed at any distance from the free-form test lens as long as this distance is smaller than twice the focal length or focal point of the free-form test lens, i.e., d<2f. This setup allows the free-form test lens to be placed closer to or even touching the planar optical component 100. In these figures, the free-form lens is shown placed at a distance d<<2f. The illumination setups of FIG. 3B and FIG. 3D correspond to the second illumination setup as described above with the difference that the spherical lens 150 is now replaced with a free-form test lens 155 and that the free-form test lens 155 is placed at a distance smaller than twice the focal point of the free-form test lens. Herein, however, for the holographic patterning, it is required that the free-form test lens is placed so that it allows only one of the circularly polarized laser beams to pass through the lens and the other not as shown in the figures. Thus, the distance at which the planar optical component can be placed in front of the free-form test lens further has a lower bound that assures that only one of the circularly polarized laser beams passes through the free-form test lens. To avoid this restriction, the illumination setups of FIG. 3E and FIG. 3F can be used instead. In these setups, the inclined beam 20 is set to illuminate the opposite side of the planar optical component 100, thus allowing the free-form lens 155 to be placed as close as possible and even touching the planar optical component 100.

For ease of explanation, the step of obtaining the actual optical function, i.e., step 202, will be described with reference to the planar optical component of FIG. 1A and using the illumination setup of FIG. 3A. However, the skilled person will appreciate that the same technique can be readily applied to the illumination setup of FIG. 3B. Similarly, the skilled person will appreciate that the same technique can be applied to obtain the actual optical function of the planar optical component of FIG. 1C using any of the illumination setups of FIG. 3C and FIG. 3D.

The analysis herein is performed considering the illumination setup of FIG. 3A with the free-form test lens 155 being placed in front of and touching the photo-alignment layer 121 of the planar optical component 100. As a surface profile of a lens defines its optical function, desired optical function of the lens, for example, the phase delay or phase difference profile can be derived from the surface profile of the lens, and vice versa. In this example, it is assumed that the surface profile 156 for the free-form lens 155 is given. Thus, for a free-form lens with a given surface profile z(x,y) and z(0,0)=0, the angle $\theta_N$ at which the light beam's rays refracted by this free-form lens strike the surface of the photo-alignment layer can be calculated as shown in FIG. 2B. As shown in the FIG. 2B, the ray of the light beam 10 exiting the free-form lens at location p(x,y,z) is refracted at the free-form surface 156 of the free-form lens 155. This ray travels in air from p(x,y,z) to a point on the alignment layer p'(x',y',0), makes an angle with the z-axis of $\theta_R$ and has an azimuthal angle $\varphi_R$.

From the above observations, the location of the incident rays r of the light beam 10, assuming the light beam has blue illumination, refracted by the free-form test lens, can be determined by means of ray tracing. The phase factor of the incident ray at p with the reference chosen as zero in the origin, is given by:

$$\exp(i\omega t + ikn_m z) \tag{1}$$

where k is wave vector of the ray for illumination in air, with $|k|=2\pi/\lambda_B$. And at the strike location p' on the photoalignment layer 121, the phase factor is given by:

$$\exp(i\omega t + ikn_m z - ik\sin\theta_R\cos\varphi_R(x-x') - ik\sin\theta_R\sin\varphi_R(y-y') - ik\cos\theta_R z) \quad (2)$$

which should correspond to the desired phase factor:

$$\exp(i\omega t + i\Gamma_B(x', y')). \quad (3)$$

The design of the freeform lens can thus be derived from these two phase factors given in Equations (2) and (3). Setting the derivative of the exponent with respect to x' and y' equal, gives the following:

$$\frac{d\Gamma_B}{dx'} = k\sin\theta_R\cos\varphi_R; \frac{d\Gamma_B}{dy'} = k\sin\theta_R\sin\varphi_R. \quad (4)$$

Because the phase delay $\Gamma_B$ is given, the incident angle $\theta_R$ and azimuth $\varphi_R$ of the ray in air from the following expressions:

$$\sin\theta_R = \frac{1}{k}\sqrt{\left(\frac{d\Gamma_B}{dx'}\right)^2 + \left(\frac{d\Gamma_B}{dy'}\right)^2} \quad (5)$$

$$\tan\varphi_R = \frac{\frac{d\Gamma_B}{dy'}}{\frac{d\Gamma_B}{dx'}}$$

The distance between p and p' can be found from the rectangular triangle formed by p, p' and the point (x',y',z). Because in this triangle the angle in p' is $\theta_R$ and there is a right angle in (x',y',z), the distance pp' is given by z/cos $\theta_R$. The phase factor of the ray can then be simplified to:

$$\exp\left(i\omega t + ikn_m z - ik\frac{z}{\cos\theta_R}\right) \quad (6)$$

Again, as this phase factor should be identical to the desired one, this allows to determine the z-coordinate of the point p connected to p'.

$$\Gamma_B = kn_m z - k\frac{z}{\cos\theta_R} \quad (7)$$

From this the z coordinate of the lens for point p associated with x',y' can be obtained as follows:

$$z = \frac{\Gamma_B(x', y')}{kn_m - k\frac{1}{\cos\theta_R}}; \quad (8)$$

Once the actual optical function of the planar optical component is obtained as given by Equation (2), the method proceeds to step 203 to estimate the deviation between the desired optical function and the actual optical function. In this example, the desired phase delay profile, i.e., $\Gamma_B$(x', y'), is compared to the actual phase delay profile, i.e., $kn_m z - k\sin\theta_R\cos\varphi_R(x-x') - k\sin\theta_R\sin\varphi_R(y-y') - k\cos\theta_R z$. In other words, the difference between them is calculated. In this example, the corrected strike location of the incident ray can be derived from Equation (8) and the fact that the k vector is parallel with the interconnection between p and p'. This can be expressed as:

$$x = x' + z\tan\theta_R\cos\varphi_R; \; y = y' + z\tan\theta_R\sin\varphi_R; \quad (9)$$

Finally, once the corrected strike locations of the incident rays are derived, the method proceeds to step 204 to derive the surface profile for the free-form master lens by determining the x, y, and z coordinates according to Equations (8) and (9) for every value of x' and y'. This procedure will usually lead to a unique solution if the desired phase delay profile is smooth and if the free form lens is placed close to the substrate.

Similarly, the above-described ray-tracing approach can be applied to derive the surface profile 156 of the free-form master lens 155 based on other optical properties of the planar optical component 100 such as, for example, the inclination angle and phase delay profile. In such a case, holographic patterning using the illumination setup of FIG. 3B with the free-form test lens 155 placed in front of the photo-alignment layer 121 at a distance smaller than the twice the focal length of the free-form lens 155 and with the light beam 10 incident on the photo-alignment layer 121 and the light beam 20 inclined with respect to the incident light beam 10 at an inclination angle $\theta_B$ (not indicated in the figure). For the phase factor of an incident beam in the xz plane with inclination angle $\theta_B$ with the z axis, the phase factor can be mathematically expressed as:

$$\exp(i\omega - ikx\sin\theta_B - ikz\cos\theta_B) \quad (10)$$

When the inclined beam is incident from the same side as the beam that is passing through the free form lens, as in the illumination setups of FIG. 3B and FIG. 3C, it is important to consider if the inclined beam is passing through the free form lens or not. By placing the inclined incident beam at the other side of the substrate, as shown in FIG. 3E and FIG. 3F, only one beam is passing through the lens before arriving at the photoalignment layer or layers. In this case the two incident beams should be circularly polarized with the same handedness.

In all the described examples it should be taken into account that the considered illumination setups use blue or UV light, while the flat liquid crystal lens, i.e., the planar optical component 100, will be typically used for another wavelength range, such as red, green, or blue. When the planar optical component 100 is designed to function as an optical diffractive element, the characteristics change with the wavelength. For example, the angle of incidence and focal distance of an optical component have to be adjusted when the illumination in blue is used to obtain a component that is to be used in the green spectrum:

$$\frac{2\pi}{\lambda_B}x\sin\theta_B = \frac{2\pi}{\lambda_G}x\sin\theta_G \text{ or } \sin\theta_B = \frac{\lambda_B}{\lambda_G}\sin\theta_G. \quad (11)$$

for the angle of incidence, and $$D_B \approx \frac{\lambda_G}{\lambda_B} D_G \tag{12}$$

for the focal distance.

By using a free from lens in the illumination setup as described above, instead of a standard spherical lens, it is possible to improve the quality of the planar optical component, i.e. the flat LC lens. The free form lens can take into account spherical aberrations, the fact that the focal distance for the illumination wavelength is different from the focal distance for the design wavelength and the fact that the coordinates for a ray hitting the lens (x,y,z) are different from the coordinates of the same ray hitting the substrate with the alignment material (x',y',0), as discussed before. For example, to obtain lensing (focal distance $D_G$ and incident light under an angle $\theta_G$) without aberrations for the green wavelength $\lambda_G$, the phase delay at the photoalignment layer in the illumination setup should be:

$$\Gamma_B(x', y') = k\frac{\lambda_B}{\lambda_G}\left(\sqrt{D_G^2 + x'^2 + y'^2} - D_G - x'\sin\theta_G\right) \tag{13}$$

The third term in this expression can be realized by inclining the laser beam incident from the left over an angle $\theta_B$ with respect to the horizontal, as shown in FIG. 3E, with $\theta_B$ according to Equation (11). The first and second term in Equation (13) determine the surface profile of the free-form master lens z(x,y), based on the procedure explained above, using Equations (5), (8) and (9).

Once the surface profile for the free-form master lens is obtained, the free-form master lens can be manufactured using conventional manufacturing techniques such as grounding, polishing, and so on. The manufactured free-form master lens can then be used to pattern the photo-alignment layer or layers of the planar optical components using the illumination setup used to derive the surface profile for the free-form master lens. In other words, if the surface profile of the free-form master lens 155 was derived using a respective illumination setup of FIG. 3A and FIG. 3C, then the same illumination setup is used to create planar optical components using the free-form master lens. This is to ensure that the pattern for which the free-form master lens was designed is recorded onto the photo-alignment layer or layers.

According to alternative embodiments, the step 202 of the method can be achieved by employing the illumination setups for holographic patterning as shown in FIG. 5A to FIG. 5D. The illumination setup of FIG. 5A comprises a free-form test lens 155 comprising two lenses. For example, the free-form test lens 155 comprises at least one free-form lens and the other lens may be for example a spherical lens. This makes the illumination setup cheaper and useful for other applications. The illumination setup of FIG. 5B comprises a free-form test lens 155 positioned at an angle with respect the planar optical component 100 and the free-form test lens 155 is illuminated by the laser beam 20. The illumination setup of FIG. 5C comprises a free-form test lens 155 positioned at the back of the planar optical component 100 with respect to the illumination by the laser beam 10, and the free-form test lens 155 is illuminated by the laser beam 20. The illumination setup of FIG. 5D comprises illumination by a laser beam 10 and a laser beam 20, wherein both laser beams 10; 20 are positioned under an angle with respect to the planar optical component 100. Any other combination of one or more of the characteristics of the illumination setups of FIG. 3A to FIG. 3F and of FIG. 5A to FIG. 5D are also understood as part of the present disclosure. The equations of paragraph are valid for the situations depicted in FIG. 3A to FIG. 3D wherein the free-form test lens 155 is substantially traverse to the laser beam 10 and wherein the free-form test lens 155 is not positioned under an angle with respect to the planar optical component 100. It is understood that the equations corresponding to the ones of paragraph which are valid for the other embodiments of illumination setups depicted in FIG. 5A to FIG. 5D can be determined from appropriate ray-tracing.

Figure 4:
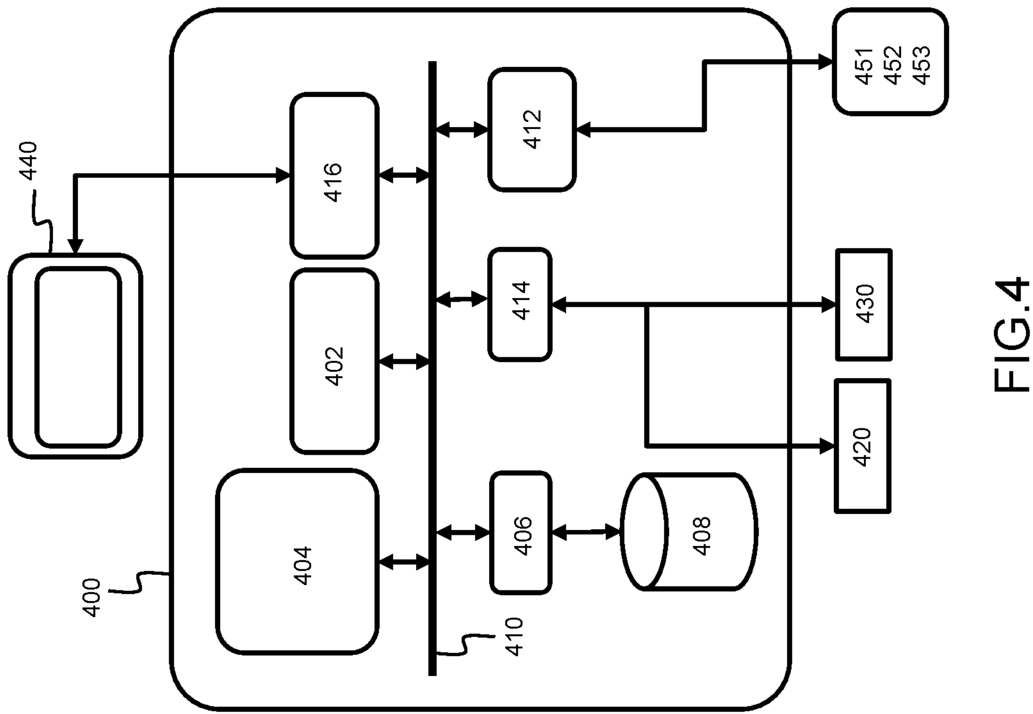
FIG. 4 shows an example embodiment of a suitable computing system for performing one or several steps in embodiments of the present disclosure.

The method for deriving a surface profile of a free-form master lens as described above with reference to FIG. 2A and FIG. 2B can be performed by means of a computing system programmed to perform the steps of the method. In other words, the method can be entirely implemented as a computer-implemented method. The computing system can for example comprise at least one processor and at least one memory. The at least one memory stores computer program code which comprises computer-executable instructions which together with the at least one processor cause the computing system to perform the steps of the method. An example of such a computing system is shown in FIG. 4. As shown in the figure, the computing system 400 may, in general, be formed as a suitable general-purpose computer and comprise a bus 410, a processor 402, a local memory 404, one or more optional input interfaces 414, one or more optional output interfaces 416, a communication interface 412, a storage element interface 406, and one or more storage elements 408. Bus 410 may comprise one or more conductors that permit communication among the components of the computing system 400. Processor 402 may include any type of conventional processor or microprocessor that interprets and executes programming instructions. Local memory 404 may include a random-access memory, RAM, or another type of dynamic storage device that stores information and instructions for execution by processor 402 and/or a read-only memory, ROM, or another type of static storage device that stores static information and instructions for use by processor 402. Input interface 414 may comprise one or more conventional mechanisms that permit an operator or user to input information to the computing device 400, such as a keyboard 420, a mouse 430, a pen, voice recognition and/or biometric mechanisms, a camera, etc. Output interface 416 may comprise one or more conventional mechanisms that output information to the operator or user, such as a display 440, etc. Communication interface 412 may comprise any transceiver-like mechanism such as for example one or more Ethernet interfaces that enables computing system 400 to communicate with other devices and/or systems, for example with other computing devices 451, 452, 453. The communication interface 412 of computing system 400 may be connected to such another computing system by means of a local area network, LAN, or a wide area network, WAN, such as for example the internet. Storage element interface 406 may comprise a storage interface such as for example a Serial Advanced Technology Attachment, SATA, interface or a Small Computer System Interface, SCSI, for connecting bus 410 to one or more storage elements 408, such as one or more local disks, for example, SATA disk drives, and control the reading and writing of data to and/or from these storage elements 408. Although the storage element(s) 408 above is/are described as a local disk, in general, any other suitable computer-readable media such as a removable magnetic disk, optical storage media such as a CD or DVD, -ROM disk, solid state drives, flash memory cards, . . . could be used. The computing system 400 could thus correspond to a circuitry configured to implement the embodiments of the method as illustrated by FIG. 2A and FIG. 2B.

As used in this application, the term “circuitry” may refer to one or more or all of the following:

(a) hardware-only circuit implementations such as implementations in only analog and/or digital circuitry and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example, and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words “comprising” or “comprise” do not exclude other elements or steps, that the words “a” or “an” do not exclude a plurality, and that a single element, such as a computer system, a processor, or another integrated unit may fulfil the functions of several means recited in the claims. Any reference signs in the claims shall not be construed as limiting the respective claims concerned. The terms “first”, “second”, third”, “a”, “b”, “c”, and the like, when used in the description or in the claims are introduced to distinguish between similar elements or steps and are not necessarily describing a sequential or chronological order. Similarly, the terms “top”, “bottom”, “over”, “under”, and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method for deriving a surface profile of a free-form master lens for patterning one or two photo-alignment layers of a planar optical component, the method comprising:

defining a desired optical function of the planar optical component;

determining a surface profile of a free-form test lens configured to provide the desired optical function;

receiving a distance between the free-form test lens and the planar optical component and receiving a wavelength of a recording light beam;

determining an actual optical function of the planar optical component;

determining a deviation between the desired optical function and the actual optical function by comparing phase differences corresponding to the desired optical function and phase differences corresponding to the actual optical function; and determining a corrected surface profile of the free-form test lens using the determined deviation, thereby deriving a surface profile for the free-form master lens.

2. The method according to claim 1, wherein the determining the actual optical function of the planar optical component comprises illuminating the planar optical component by means of two circularly polarized laser beams and the free-form test lens, thereby patterning the one or two photo-alignment layers.

3. The method according to claim 2, wherein the illuminating comprises illuminating one side of the one or two photo-alignment layers of the planar optical component through the free-form test lens with one of the two circularly polarized laser beams and illuminating the opposite side of the one or two photo-alignment layers of the planar optical component with the other circularly polarized laser beam, wherein the circularly polarized laser beams have a same handedness and are incident at a straight angle in order to pattern the photo-alignment layer.

4. The method according to claim 2, wherein the illuminating comprises illuminating one side of the one or two photo-alignment layers of the planar optical component through the free-form test lens with one of the two circularly polarized laser beams and illuminating the same side of the one or two photo-alignment layers of the planar optical component with the other circularly polarized laser beam, and wherein the circularly polarized laser beams have an opposite handedness and are positioned at a predetermined angle with each other in order to pattern the one or two photo-alignment layers.

5. The method according to claim 3, wherein the determining the actual optical function of the planar optical component further comprises placing the planar optical component in front of the free-form test lens and at a distance smaller than twice the focal point of the free-form test lens.

6. The method according to claim 3, wherein the determining the actual optical function of the planar optical component further comprises placing the planar optical component in front of the free-form test lens and touching the free-form test lens.

7. The method according to claim 1, wherein the determining comprises tracing respective incident locations of rays of the circularly polarized laser beam illuminating the one or two photo-alignment layers through the free-form test lens, the respective incident locations indicating the location of the rays on the one or two photo-alignment layers with respect to a centre location of the one or two photo-alignment layers, thereby deriving phase differences, $\Gamma_{UV}$, between the incident rays' locations and the centre location.

8. The method according to claim 7, wherein the determining further comprises calculating from the obtained phase differences, $\Gamma_{UV}$, and the surface profile of the free-form test lens, a deviation in the surface profile of the free-form test lens.

9. The method according to claim 8, wherein the determining the corrected surface profile of the free-form test lens comprises correcting the surface profile of the free-form test lens by means of the determined deviation in the surface profile of the free-form test lens, thereby deriving the surface profile of the free-form master lens.

10. A method for fabricating a planar optical component, the method comprising:

providing a substrate coated with a photo-alignment layer;

patterning the photo-alignment layer by means of holographic patterning using a free-form master lens with a desired optical function obtained using the method according to claim 1, thereby creating a photo-alignment pattern thereon with the desired optical function; and providing a liquid crystal layer over the patterned photo-alignment layer, thereby aligning the liquid crystal material based on the photo-alignment pattern.

11. A method for fabricating a planar optical component, the method comprising:

providing two substrates spaced apart to provide a gap therebetween; the respective substrates having an inwardly facing surface coated with a photo-alignment layer;

pattering the respective photo-alignment layers by means of holographic patterning using a free-form master lens with a desired optical function obtained using the method according to claim 1, thereby creating a photo-alignment pattern on the respective photo-alignment layers with the desired optical functions; and filling the gap with a liquid crystal material, thereby aligning the liquid crystal material based on the photo-alignment patterns.

12. A computer program product comprising computer-executable instructions for performing the following steps when the program is run on a computer:

defining a desired optical function of a planar optical component;

determining a surface profile of a free-form test lens configured to provide the desired optical function;

receiving a distance between the free-form test lens and the planar optical component and receiving a wavelength of a recording light beam;

determining an actual optical function of the planar optical component;

determining a deviation between the desired optical function and the actual optical function by comparing phase differences corresponding to the desired optical function and phase differences corresponding to the actual optical function;

determining a corrected surface profile of the free-form test lens by means of the determined deviation, thereby deriving a surface profile for a free-form master lens.

13. A computer readable storage medium comprising computer-executable instructions for performing the following steps when the program is run on a computer:

obtaining a desired optical function of a planar optical component;

obtaining an actual optical function of the planar optical component, the actual optical function being described as recorded using a free-form test lens with a surface profile configured to provide the desired optical function;

estimating a deviation between the desired optical function and the actual optical function;

correcting a surface profile of the free-form test lens by means of the estimated deviation, thereby deriving a surface profile for a free-form master lens.

* * * * *